(12) United States Patent
Bar-Or et al.

(10) Patent No.: US 12,361,149 B1
(45) Date of Patent: Jul. 15, 2025

(54) PROJECT-BASED UNIFIED DATA ANALYTICS IN A PROVIDER NETWORK

(71) Applicant: Amazon Technologies, Inc., Seattle, WA (US)

(72) Inventors: Amir Shmuel Bar-Or, Newton, MA (US); Vidit Ochani, Bellevue, WA (US); Julien Jacques Ellie, Fall City, WA (US); Shikha Verma, San Ramon, CA (US); Nanda Madhugiri Vijaydev, San Jose, CA (US); Jeffrey Ralph Ruggles, Sunnyvale, CA (US); Aparna Shikhare, San Jose, CA (US); Shilpa Mohan, San Jose, CA (US); David Geyer, Alexandria, VA (US)

(73) Assignee: Amazon Technologies, Inc., Seattle, WA (US)

( * ) Notice: Subject to any disclaimer, the term of this patent is extended or adjusted under 35 U.S.C. 154(b) by 401 days.

(21) Appl. No.: 17/994,811

(22) Filed: Nov. 28, 2022

(51) Int. Cl.
 *G06F 21/62* (2013.01)
(52) U.S. Cl.
 CPC .. *G06F 21/6218* (2013.01); *G06F 2221/2101* (2013.01); *G06F 2221/2141* (2013.01)

(58) Field of Classification Search
 CPC ......... G06F 21/6218; G06F 2221/2101; G06F 2221/2141
 See application file for complete search history.

(56) References Cited

U.S. PATENT DOCUMENTS

| | | | |
|---|---|---|---|
| 11,063,952 B2 * | 7/2021 | Boland | H04L 9/3218 |
| 11,962,511 B2 * | 4/2024 | Cahill | G06F 21/6218 |
| 12,238,102 B2 * | 2/2025 | Palanisamy | H04L 67/50 |
| 2007/0136603 A1 * | 6/2007 | Kuecuekyan | H04L 63/0884 |
| | | | 713/185 |

* cited by examiner

*Primary Examiner* — Han Yang
(74) *Attorney, Agent, or Firm* — Nicholson DeVos Webster & Elliott LLP

(57) ABSTRACT

A system and method for project-based uniform data analytics in a provider network. The system and method provide data projects. A data project is a secure container that brings people, data, and tools together to enable easy collaboration and access management for data analytic projects. A data project enables a group of users to collaborate on a particular business use case for producing and consuming data. A data project and its content are subject to their own access controls so that only authorized individuals, groups, and roles can access the projects and data that project has subscribed to, and only use tools permitted by project permissions.

20 Claims, 8 Drawing Sheets

PROJECT-BASED UNIFIED DATA ANALYTICS IN A PROVIDER NETWORK

TECHNICAL FIELD

The present disclosure relates generally to data analytic computing systems and methods, and more specifically to a new and useful system and method for project-based unified data analytics in a provider network.

BACKGROUND

Data analytics is a broad field of using data and computer-based tools to make decisions. A goal of data analytics is enabling data experts including data scientists, engineers, and analysts to access and understanding findings in data. Data analytics includes both human and machine steps performed to discover, interpret, visualize, and tell a story about data to drive strategy and decision making. When done well, data analytics can help an organization find trends, uncover opportunities, predict actions, triggers, or events, and make important organizational decisions.

Data analytics is systematic in it that uses many different activities and draws on different types and sizes of data sources. Data analytics encompasses different subject areas including data science, machine learning, and applied statistics. A common tangible output of a data analytics practice is a well-planned report that uses data visualizations to tell a story of salient points so that other members of the organization who are not data experts can understand, develop, and adapt strategy and decision.

Complex data analytics use cases often involve a large team of data engineers, data scientists, and business analysts. Datasets are often distributed across on-premises, provider network, and third-party locations. Team members spend an inordinate amount of time familiarizing themselves with and gaining access to the different networks, services, and systems before they can even begin working with and conducting analyses on the datasets.

Traditional approaches for discovering datasets rely heavily on institutional knowledge and word-of-mouth. Analysts may be unaware of a useful dataset unless they serendipitously encounter it. Or an analyst may not know how to access a dataset or even how to request access to a dataset.

Providing access control for datasets and ensuring that users know how to request access to datasets is an ongoing challenge. Datasets are constantly growing, new datasets are constantly being added, and old datasets constantly being deprecated. The tasks of discovering, protecting, and governing the datasets is continuous. Ensuring the datasets are being shared with the correct people, applications, and with the correct permissions is seemingly never-ending challenge. Ensuring compliance with security policies as datasets grow and change and while the policies also change to adapt to new requirements is another challenge.

The combination of all these challenges presents a substantial challenge to an organization desiring to gain a better understand of data through data analytics.

BRIEF DESCRIPTION OF DRAWINGS

Various examples in accordance with the present disclosure will be described with reference to the drawings, in which.

Figure 1:
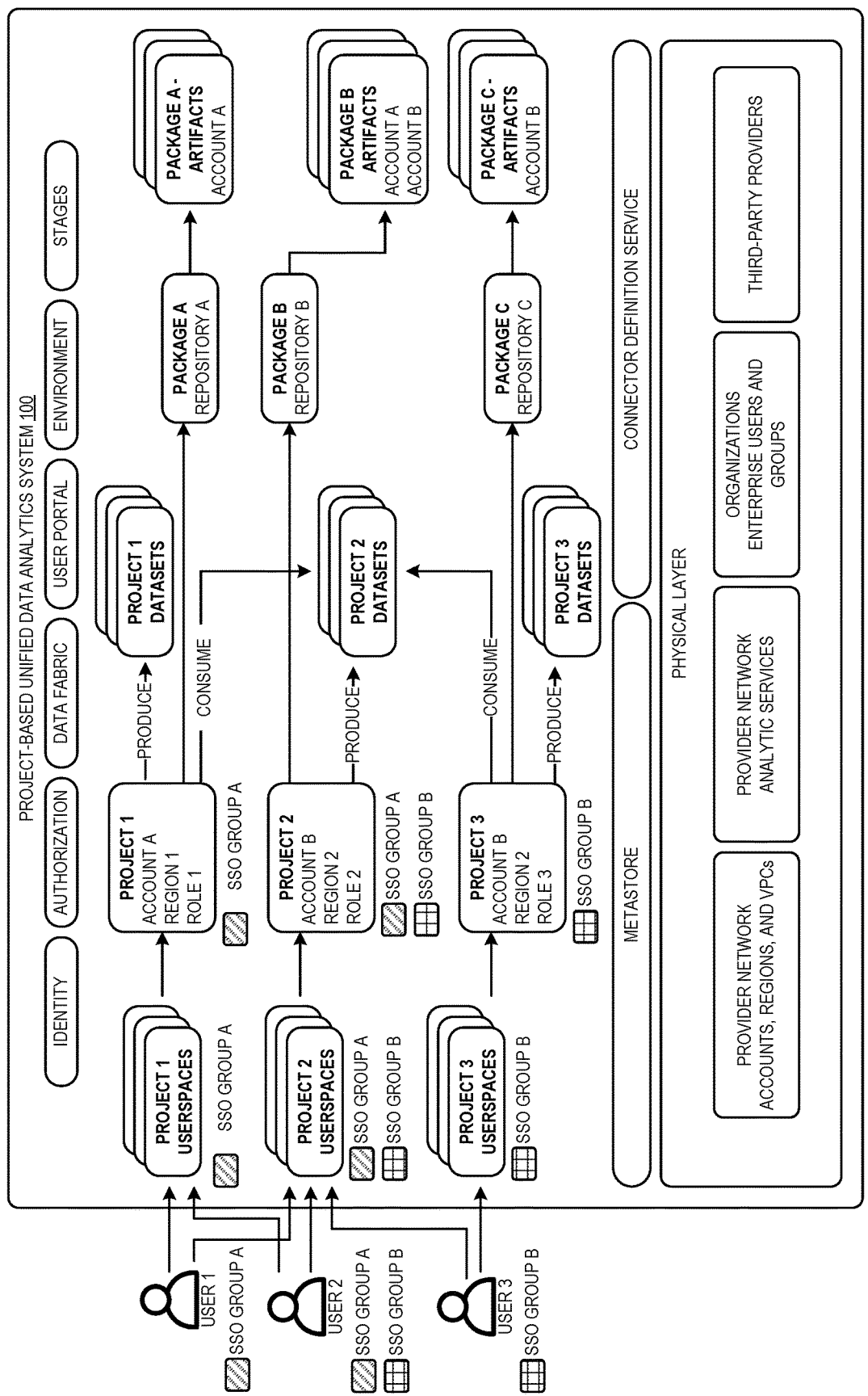
FIG. 1 illustrates a system for project-based uniform data analytics in a provider network.

It will be appreciated that for simplicity or clarity of illustration, elements illustrated in the figures have not necessarily been drawn to scale. For example, the dimensions of an element may be exaggerated relative to another element for clarity. Further, if considered appropriate, reference numerals have been repeated among the figures to indicate corresponding or analogous elements.

DETAILED DESCRIPTION

The following description is not intended to limit the invention to the examples described, but rather to enable any skilled person in the art to make and use this invention.

FIG. 1 illustrates a system 100 for project-based data analytics in a provider network. The system 100 supports a uniform data analytics experience across a set of provider network services. The provider network functions to provide a computing environment in which the techniques disclosed herein may be implemented. The provider network is programmed or configured to adhere to a cloud computing model. The model enables ubiquitous, convenient, on-demand network access to a shared pool of configurable resources such as virtual machines, containers, networks, servers, storage, applications, services, or any other configurable resource of the provider network. The resources can be rapidly provisioned and released with minimal management effort or service provider interaction.

A user of the provider network (sometimes referred to herein as a "customer" of the provider network) provisions resources in the provider network, such as virtual machines, containers, server time, network storage, or any other resource, as needed automatically with minimal or no human interaction with the service provider. Resources of the provider network 100 may be available over an intermediate network (e.g., the Internet) and accessed through standard mechanisms that promote use by heterogeneous remote electronic devices such as thin or thick client platforms or any other type of computing platform such as desktop computers, mobile phones, tablet computers, laptop computers, workstation computers, smart appliances, Internet-of-Things (IoT) devices, or any other type of electronic device.

Resources such as compute, storage, processing, memory, and network resources in the provider network are pooled to serve multiple customers using a multi-tenant model, with different physical and virtual resources dynamically assigned and reassigned according to customer demand. There is a sense of location independence in that the customer generally has no control or knowledge over the exact location of provided resources but can specify location at a higher level of abstraction such as, for example, at the level of a country, state, datacenter, or any other location granularity. The provider network automatically controls and optimizes resource use by leveraging a metering capability (e.g., on a pay-per-use, on a charge-per-use basis, on a subscription basis, or any other fee basis) at a level of abstraction appropriate to the type of service such as compute, storage, processing, memory, network bandwidth, active customer accounts, or any other suitable level of abstraction. Resource usage in the provider network is monitored, controlled, and reported, providing transparency for both the provider and the customer of a utilized service.

The provider network can provide its capabilities to customers according to a variety of different service models including Software-as-a-Service (SaaS), Platform-as-a-Service (PaaS), Infrastructure-as-a-Service (IaaS), or any other service model.

With SaaS, a capability is provided to a customer using the provider network's software applications running on the infrastructure of the provider network. The applications may be accessible from various remote electronic devices through either a thin client interface such as a command line interface (CLI), a graphical user interface (GUI) (e.g., via a web browser or a mobile or web application), a Software Development Kit (SDK), or any other interface. The infrastructure of the provider network includes the hardware resources such as server, storage, and network resources and software deployed on the hardware infrastructure that support the services being provided. Typically, under the SaaS model, the customer does not manage or control the underlying infrastructure including network, servers, operating systems, storage, or individual application capabilities, except for limited customer-specific application configuration settings.

With PaaS, the customer is provided the capability to deploy, onto hardware and software infrastructure of the provider network, customer-created or acquired applications using programming languages, libraries, services, and tools supported by the provider network or other sources. Typically, under the PaaS model, the customer does not manage or control the underlying hardware and software infrastructure including network, servers, operating systems, or storage, but can have control over the deployed applications and possibly configuration settings for the application-hosting environment.

With IaaS, the customer is provided the capability to provision processing, storage, networks, and other fundamental computing resources where the customer can deploy and run arbitrary software, which can include operating systems and applications. The customer typically does not manage or control the underlying hardware and software infrastructure but can have control over operating systems, storage, and deployed applications and possibly limited control of selecting network components such as, for example, host firewalls.

The provider network can provide its capabilities to a customer according to a variety of different deployment models including as a private cloud, as a community cloud, as a public cloud, as a hybrid cloud, or any other deployment model.

In a private cloud, the hardware and software infrastructure of the provider network is provisioned for exclusive use by a single organization which can comprise multiple customers. The private cloud is owned, managed, and operated by the organization, a third party, or some combination of them, and it can exist on or off premises.

In a community cloud, the hardware and software infrastructure of the provider network is provisioned for exclusive use by a specific community of customers from organizations that have shared concerns such as mission security requirements, policy, and compliance considerations. The community cloud is owned, managed, and operated by one or more of the organizations in the community, a third party, or some combination of them, and it can exist on or off premises.

In a public cloud, the infrastructure is provisioned for open use by the public. The public cloud is owned, managed, and operated by a business, academic, or government organization, or some combination of them. A public cloud can exist on the premises of the public cloud provider.

In a hybrid cloud, the infrastructure is a composition of two or more distinct cloud infrastructures (private, community, public, or any other cloud infrastructure) that remain unique entities, but that are bound together by standardized or proprietary technology that enables data and application portability such as, for example, cloud bursting for load balancing between clouds.

Analytic users of the system 100 are data product producers and data owners such as data analysts, business intelligence engineers, data engineers, data architects, and data scientists. Other users (equivalently "end-users") such as a business user that consumes dashboards or business applications may not be direct users of the system 100. End-users may consume analytic products created by the analytic users. The system 100 simplifies the use of services and resources in the provider network by using separation of concerns to reduce the complexity for analytic users in generating analytic products where the analytic users may not be familiar with provider network identity and access control mechanisms, network, and infrastructure.

The system 100 functions to allow an analytic user to assume various different personas. An analytic user is a person with external identity that is provided by a single-sign on (SSO) system. The SSO system can obtain identities from external identity provider such as, for example, an Active Directory system or Lightweight Directory Access Protocol (LDAP) system.

A persona defines a set of analytic users who perform various tasks in the system 100. An analytic user is mapped to a persona through an authorization group. A possible persona includes "IT administrator/environment administrator" which is responsible for setting up the data infrastructure foundation for a team and ensuring that it is secure. The IT administrator/environment administrator is responsible for any or all of: setting up a data engineering platform, leveraging expertise about the data landscape in an organization to facilitate data exchange and usage through the organization, configuring rented resources of the provider network, supporting other analytic users 102, coordinating with developer-operations or cloud-developer personnel to resolve network or cloud security issues, or any other task suitable for an IT administrator/environment administrator.

Another possible persona is a "data owner." A data owner typically has managerial responsibility for the data assets they own and responsible for approving access to other teams. They also have the power to hide and data assets under their purview.

Another possible persona is a "team administrator." The team administrator is an operational manager or a technical program manager in the data platform team of the customer and is responsible for providing analytical business teams access to resources in the provider network 100 where they can conduct their work. A team administrator works with analytical team managers\directors, learns their requirements and sets up their initial working environment and makes any changes they might require. In large organizations, this work can be distributed to operational managers in each business unit. The team administrator often provide governance, cost visibility and control over the analytical teams.

Another possible persona is a "data producer." A data producer is responsible for creating high quality data products for consumption by other teams. The data producers typically want to create high quality data products for their business area, by integrating data from various data sources across the enterprise or within the provider network, analyzing and creating new insightful data assets. They often search for new data sources and ask for access permissions, and then investigate these data source before using them in the analysis. Often, the analysis that they create is turning into new production jobs that are responsible for maintaining and updating the new data products. The job classification is often range from data engineer to data scientists and analytical business domain analyst.

Another possible persona is a "data consumer." A data consumer creates dashboards and reports to address the needs of their business. They often use a business intelligence platform that provide visual tools to create the dashboard and reports and share these with their department or organization. These dashboards and reports often need much investment and industrial strength to support hundreds if not thousands of users. The job classification of a data consumer is often a business intelligence engineer\analyst.

Another possible persona is an "operations engineer." An operations engineer is responsible for technical operations that enable and support data analytics. They create workflow and pipelines for continuous integration and continuous deployment and automation of analysis. They care about stability of the analysis and use code versioning and release processes to ensure quality. They can work on production operations for both data and machine learning operations.

An authorization group represents a set of analytic users that are authorized by the system 100 to perform certain actions. Analytic users are added to and removed from authorization groups by analytic users of the group that are designated as group owners. An authorization group has at least one group owner. SSO user groups can be used to map analytic users into authorization groups. Additionally or alternatively, analytic users can be added directly to authorization group by other methods such as, for example, by email invitations or requests to join an authorization group.

A resource created in the provider network is governed by identity and access management permissions. Resources are categorized into two groups: logical resources and physical resources. A physical resource provides data storage, data networking, or compute capability. A logical resource is equivalently referred to herein as an "artifact." For example, a virtual machine instance or container in the provider network is a physical resource, while a machine learning model is a logical resource. Artifacts (a.k.a. "logical resources") are described in greater detail below.

The system 100 supports environments. The system 100 may support multiple environments simultaneously and concurrently. An environment functions to provide access to a single analytical data platform for a single customer and its users. An environment can be associated with and accessed from multiple accounts of and regions of the provider network. An environment can encompass a customer's physical architecture composed of accounts, data stores (both on-premises data stores and provide network data stores), network infrastructure, governance accounts, and analytical accounts. The system 100 can bridge physical barriers between data sources and data consumers using this configuration information associated with the environment. An environment is self-contained in that users cannot search or share data across environments. Instead, a customer uses a single environment unless the customer needs hard separation within their organization. For example, a financial services bank may use separate environments for the sell-side department and the investment banking department.

An environment configuration includes any or all the following configuration: SSO broker configuration, operational user accounts (e.g., user accounts where analytical activity is performed by analytical users), data source accounts (e.g., user accounts where native data store applications in the provider network are operating), external connections to other systems, catalog account, enterprise data warehouse database location, code artifact server, or any other suitable environment configuration.

An environment encompasses a centralized "meta-store" catalog. The meta-store catalog indexes and provides search functionality for all data stores which are connected to the environment. An environment also encompasses a "projects" catalog that allows analytic users to build analytic solutions.

A data asset is a technical and business metadata representation of a data object that resides in the customers' physical data infrastructure and data sources. A data asset is shared and discoverable across a set of analytic users. A data asset is a root abstraction for an entity that exists in a catalog. Examples of a data asset include a data set and a data product, both of which are described in greater detail below.

A data asset is associated with a domain that defines the organizational unit that owns the data asset. Other examples of a data asset include a database table, an extract-transform-load (ETL) workflow, a visualization dashboard, or a slide deck presentation file. A data asset can contain physical information about the data of the data asset such as, for example, the storage location of the data, a schema format of the data, a security classification for the data, a description of the data, or any other suitable metadata about the data.

An artifact is a logical resource in the provider network. For example, an artifact can be a code object that is part of a data processing application. The type of the artifact depends on the provider network service or the application used by the user. For example, an artifact can be an event driven ETL job or a set of data transformation steps (equivalently a "recipe").

An artifact manifests in the provider network in two ways. First, an artifact manifests as an object in a provider network service that supports the artifact in the context of a provider network user/customer account. Second, an artifact manifests as a serialized file that contains the definition of the artifact. This second manifestation facilitates managing the lifecycle of the artifact by supporting versioning and backup. For example, an artifact can be any of: an executable script (e.g., an extract, transform, and load (ETL) script) that connects to a data source in the provider network, processes data received from the data source, and writes the processed data to a data target in the provider network; a crawler that accesses a data store in the provider network, extracts metadata, and creates table definitions in a catalog database; a set of data transformation steps; a read-only snapshot of a data analysis shared with users for reporting purposes (equivalently a "dashboard"); a machine learning training or inference job, a file; a database object definition such as a schema, a table definition, a database trigger, a materialized view, etc.; or any other suitable artifact.

A data set is structured data (e.g., hierarchical or relational data) that can be referenced, accessed and governed by a name. For example, for a relational data set, a typical data set is a database table of a database. A description of a data set is stored in a specific type of data asset in a data catalog. A data set can be physically stored on a storage file system or in a database. In addition to or an alternative to hierarchical and relational data, a data set can be semi-structured data such as JavaScript Object Notation (JSON) formatted data or eXtensible Markup Language (XML) formatted data.

A catalog is a collection of technical and business metadata represented as data assets that can be searched, discovered, and managed by users. Each environment has a catalog.

To improve stability and quality, customers adopt software development methodologies such as creating separate life cycle stags for development, quality assurance and production, code versioning, code packaging, release management and automated deployment to various stages. This stage methodology is supported by the system 100 by providing a set of features that supports these stage-based software development practices. The stage concept of the system 100 supports the set of features. When an environment is created in the system 100, three stage entities within the environment are also created for development (DEV), quality assurance (QA), and production (PROD). Other concepts supported by the system 100 can belong to a single environment stage or multiple environment stages. Users are authorized to access or update resources in certain stages and may have no access to resources in other stages. Each stage holds a set of parameters with a set of concrete values that are associated with this stage. This parameter set increases reusability of artifacts that require deployment in multiple stages.

A connector definition contains information required to locate and access a service or data source. For a database service or data source, the connector definition usually contains the physical location of the database service such as a network address (e.g., an Internet Protocol address) or domain name service (DNS) domain name, the network port for the service or data source, and network security if it exists such as virtual private cloud or security group. A connector definition does not contain the security information (e.g., credentials) required to establish access to the service or data source. Instead, the security information is stored separately in a security profile using a service of the provider network for managing, retrieving, and rotating database or data source credentials, application programming interface (API) keys, or other access secrets. The security profile is stored in association with the project that uses the connection. The system 100 can use the connection definition information to create runtime connectors in the analytic services in the provider network used by analytic users. A connector definition can be associated with a single stage or with multiple stages by tagging the definition with the system 100. If a database or data store should only be used in, for example, a production stage, then the connector definition for the database or data store should be tagged only to the production stage. However, if the connector definition can be used in multiple stages, then the connector definition can be tagged to multiple stages. A tag can take the form of a key-value pair.

A connector credential profile stores a single security context that can be used to connect to an associated data store. For example, the security context can be a username and password pair for a database connection or a username plus private key file for a database or API authentication. Multiple connector credential profiles can be associated with a single connector definition. A connector credential profile can also be associated with a stage or stages in which the profile can be used. The sensitive secret information of the profile is stored in and accessed from a service in the provider network for managing, retrieving, and rotating access secrets and the profile only references the secret information as stored by the secret management service. A credential profile is also created as an identity and access management (IAM) resource and permitted only to authorized roles.

A project is a solution for satisfying security and cost management while providing analytic user with freedom of operation and to minimize boundaries to increase the productivity of analytic users. A project is a collaborative space where analytic users of the project can collaborate on data analytic tasks including exchanging data and code under a common set of capabilities and permissions. A project is linked to at least one operational account and the region associated with the environment that contains the project. While analytic users can access data from any account and data stores that are linked to the environment, the user conduct work with the account where the project is created. Different projects can be created in different accounts allowing for fully distributed work across provider network accounts.

The system 100 monitors and audits individual user activity with a project. However, users with the same user designation within a project have the same capabilities and permissions while work inside the project. User designations are described in greater detail below. Within a project, a user can execute activities, access data created inside the project, and access authorized external data scope by a team data policy. When a new user is assigned to a project with a user designation, the user acquires all the functional and data permissions of project users with the same designation.

A project facilitates interactive sessions by users as well as programmatic production scripts that run inside the project and share permissions and notifications of the project. A project can be ephemeral in that it exists only while serving a specific use case. Alternatively, a project can be permanent serving an organizational unit. An ephemeral project offers a limited access scope by time, data, and user group. A permanent project requires less operational governance.

A project is managed by project administrators. A project administrator is responsible for provisioning teams as needed. To provision a project, a project operator defines the following: 1) a group of authorized users for each user designation, 2) functional capabilities, 3) data access policy, and 4) resource allocations.

A user group controls user access to a project. The user membership in a team can be managed by the enterprise identity access management system or directly by an administrator of the system 100. Once a project user is authenticated, the user is authorized to use any of the project capabilities, data access, and resources according to the assigned user designation. For a customer that prefers using direct access via an account of the provider network over a SSO solution, the project role functions as the group and identity and access management users can assign the group as the group members. An administrator of the system 100 can manage SSO groups and user directly from a web-based graphical user interface console of the system 100.

A project can be configured to allow a set of functional capabilities. These capabilities can include provider network services that offers functionality for accelerative user activities within the project. Additionally or alternatively, these capabilities can be applications in the provider network such as development workspaces (e.g., JUPYTER, SQL WORKBENCH, dashboards, etc.) The functional capabilities do not provide any access to data that is outside of internal resources of the project. The functional capabilities are high-level abstractions that deploy both a set of permissions as well as any internal resources that are needed to achieve the functionality. Examples can be the ability to perform queries with a first service in the provider network, the ability to do data preparation with a second service in the provider network, or the provisioning of an application. The functional capabilities specification of a project allows for a simpler control for an administrator of the system 100 without the need for the administrator to fully understand lower-level fine-grained identity and access control policies that each underlying provider network service uses for access control.

A project supports an extensible plugin repository that allow third-party vendors as well as customers to develop plugins for applications independently. The plugins help deploy the application into the project thereby allowing the application to acquire the foundation support for security, data access, cost monitoring, etc. Using an administration interface, an administrator of the system 100 is enabled to install new application plugins into an application store by loading a new plugin package. Additionally or alternatively, the administration interface enables when creating a new project, or updating existing one, select applications to deploy from the AppStore.

Various internal physical provider network resources are allocated to a project based on selected functional capabilities. The internal resources are shared resource for activities of the project users. Some resources can be shared across different functional capabilities (e.g., a data storage bucket), other resources can be consumed by a single functional component (e.g., a data processing unit).

An administrator of the system 100 can monitor the resources consumed by a project, assign capacity limits to each resource type, and measure resource cost per team. For an ephemeral project, the project aggregated cost allows an organization to attribute cost directly to an analytic use case. For a permanent project, the cost can be attributed to the organization team running the project.

A project has required resources that are created within the project such as, for example, elastic file system storage. Additionally or alternatively, a project has resources that depend on the enabled capabilities such as, for example, high-performance file system storage for high throughput workloads. Additionally or alternatively, a project has on-demand resources such as CPU cycles of the provider network that are consumed when project code is executed on-demand. When a project is deleted, the internal resources belonging to the project are deleted too.

A project is assigned to a single domain. Any data assets or data products that are published by the project are assigned to this domain or any of its sub-domains in the domain hierarchy. When a data steward delegates ownership of a data asset to a team, they can delegate the data asset only to projects that are assigned to project domain. Projects that operate across multiple domains can be assigned to the nearest shared ancestor domain.

A project is granted access to one or more stages that are defined for the environment. Users of a project select a single stage as the current context. Additionally or alternative, a default may be used. The selected or default stage is part of a catalog search and only data assets that belong to the current stage are returned as results to the search. As credential profiles are associated with a stage, even if the same connector definition is used (and therefore data assets are shared across stages), the credential profiles can provide different access levels between different stages. For example, contributors can acquire read-only access only to the data assets in a production stage versus write access to data assets in a development stage. All stages assigned to project are in the same account as the project. Alternatively, the system 100 can be extended to allow association of a production or development account with specific projects thereby enabling production development to dedicated accounts.

External data of a project is any data that is not stored on internal physical resources of the project. External resource of a project are any resources of the provider network that are not provisioned and owned by the project. An external data access policy defines the scope of the external data access (read and write) that projects allow access to and from. Initially, according to the principle of least privilege, a project does not allow access to any external data and resources.

Data access polices can be implemented in several ways. In one way, external data access policy can be a direct permission policy to use a resource such as, for example, a data storage bucket of a storage service in the provider network. In another way, external data access policy can be indirect by assigning the project an enterprise security designation that in turn provides access entitlements per an enterprise security policy. For example, a designation of CONFIDENTIAL can provide access to all resources classified as CONFIDENTIAL. In addition, data access policy can continue to evolve in a distributed fashion as a data owner-data consumer model where a project member can ask for access for a new required data set, and a data owner can authorize the access for the entire project and all users of the project while acting inside the project. This permission is granted to the project and not the individual users and lasts no longer than the project lifespan itself. This separation between functional policy and data policy allows the project users to obtain access to data governed by the data policy by any tool allowed by the functional policy.

Similarly, a project user can publish a produced data set and make it accessible outside of the project. If the project is ephemeral, the data set is written into an external storage such as an external data storage bucket or an external database and the project user can publish the data set to a catalog. When projects are deleted, the permissions given to the project are removed, and internal resources are deleted as well. If new data sets are created in the project and these data sets need to exist after the project deletion, then the project can be stored in external resources (e.g., an external data storage bucket) and not on the internal resource (e.g., internal data storage bucket).

Collaboration between users within a project is achieved via sharing and communication. Artifacts can be shared across the users as all users have shared permissions to any enabled services in the provider network. The system 100 can provide conflict resolution or looking for concurrent access on the same object. Code can be shared using a shared file system which is created by default for each project, as well as via a shared source repository (e.g., a shared GIT repository that is internal or external to the project). Data can be shared by using the storage systems that are accessible to all users as they are sharing the data access policy as well the internal storage resources.

The system 100 can function to collect certain events regarding the project and share them on a common communication channel visible to all users to the project. The system 100 can allow an administrator of the system 100 to assign a communication channel as well as a notification channel for each project.

Collaboration between projects is achieved by producing data sets that are shared with other teams. The system 100 supports two models of access authorizations: (1) distributed data sets access authorization model, and (2) tag-based data sets access authorization policy.

A distributed data set authorization model where owners of data sets are responsible for approving or denying requests for access from other users. This model is scalable as each team can own their data sets in terms of quality and availability. The system 100 supports this model by allowing projects to produce their own data sets as well as consume data sets created by other teams. Users of a project can request access to a data set that is owned by another team. The request is queued for users of the owning project and the users of the project are notified for the pending request. Upon review of the request, the users of the project can authorize or deny the access request. It should be noted that the project who owns the data set is not necessarily the same project that has write access and produces the data set. A project can own data sets that resides in any of the accounts or data stores that are associated with an environment, but it can produce data sets only where it resides.

The system 100 defines the following roles with respect to a project: (1) owner, (2) contributor, (3) viewer, (4) operator, and (5) administrator.

An owner of a project is responsible for the project. An owner can add or remove other users to and from the project. An owner is the gatekeeper for data set access requests, or data set publication requests, or configuring auto-approval rules.

A contributor of a project is a project developer. A contributor is allowed to create, modify, and delete any artifacts owned by the project. An owner is a contributor as well. A contributor has access to all the data sets approved for the project. A contributor can request access to new data sets or publish new data sets to the catalog, subject to owner approval.

A viewer is capable of only viewing the artifacts produced by the project team. A viewer is unable to create or modify artifacts in the project. A view has read access to all data sets for which the project has access to.

An operator of a project is a user who is allowed to version, promote, and deploy artifacts from one stage to another. The system 100 facilitates operators by support packages as described in greater detail below.

An administrator of a project is capable creating projects, updating projects, and deleting projects. An administrator is also capable of change other users' designations and ability to set the security context for connections to external systems.

The system 100 supports access to data sets using semantic tags that is based on policy tags. A policy tag (equivalently "tag") is a key-value pair and defines authorization permissions based on attributes. A project can be associated with tags that defines the level of access the project has. A project that requests access to a data set that is tagged with the same policy tags is granted access without an approval chain. And if the data set already exists in the local catalog of the project, a request is not needed.

Tag-based access polices can be used in combination with the distributed data set access model. This reduces the overhead on data set owners. The system 100 provides a user interface to process and review requests for access, as well as ability to manage and monitor the current access of the team to data sets.

The system 100 supports an access approval workflow that encompasses traceability and notifications. Actions that change the access level of a project are logged. In addition, the project context containing a project identifier and a user identifier are passed to any integrated service of the provider network to allow logging by those integrated services of actual user access calls. As part of the system 100 interface, a unified view at the project level provides access to the activity and permission changes to support security operations and audit, as well as cost governance and access minimizations (eliminate unneeded/unused provisioned access).

A project provides a single unified view for all events that can impact the work of the project. For example, changes of schema for data sets that are consumed by the project, or a new user that joins the team, or even a new data set that has been published by one of the project members. These notifications provide both an interactive view, as well as a programmatic trigger using a publish-subscription mechanism to allow consequent actions to be performed for the project. Each user a single virtual inbox where requests for actions can be aggregated from multiple projects which the user is a member of. For example, a request for data access approval will appear in all users' inboxes that own the particular data sets across the projects.

A project profile is a project template created by an administrator of the system 100 to simply the creation of projects. A project can be created using a project profile. A project profile can encompass any or all of the following technical details: a profile name; a domain; a region; a virtual private cloud tag; a Boolean flag indicating whether the project is publicly searchable; and a set of capabilities that are required, optional, or disable of the project.

Once a project is created using a project profile, the profile is no longer impacting existing projects. That is, any subsequent change to a profile, will not change existing projects created using the profile. Thus, the profile serves as a template only. When an environment is created, the system 100 creates a project profile using the environment account and region as the A package is an organizational container for artifacts. A package functions to allow the organization and management of artifacts across multiple provider network services and applications. A package belongs to a single environment. A package has an owning project that can control the access to the package. The initial owner of a package is the project that creates the package. Projects can create multiple packages as needed for smaller deployment granularity.

A package is accessible by the owning project. A package also functions to allow management of releases and pipelines to productionalize the code including release versioning, continuous integration and continuous deployment/delivery from development to production, approval workflows, and test monitoring.

A package can be unmanaged such that artifacts are linked into the package, but the artifacts are not created nor destroyed using the package. In this scenario, the package serves as a single unifying view of the artifacts that belong to a single use case. Alternatively, a package can be managed where the entire lifecycle of the contained artifacts is managed by the package. A package provides access to artifacts that are contained within the package. A project can be granted access to a package, which provides access to the project to the artifacts of the package.

In addition to artifacts, consumed and produced data assets and data products can also be associated with a package directly by users of the project. The associate provides visibility into what data is consumed and produced by the package and for what specific data products.

An unmanaged package is implemented by tagging the artifacts with an identifier of the package. This functions to allow easy searching and viewing of artifacts across the services. When a new a new project is created, an initial empty package is also created. Project contributors, owners, and operations can create new packages as needed to create more focused/specialized artifact containers.

A managed package is an enhancement of an unmanaged package where the lifecycle of the artifacts is managed by the package directly. With a managed package, artifacts are serialized and stored in the provider network. For example, the artifacts of a package can be stored in a version control repository that is owned by the package.

A managed package is associated with one or more stages that is part of an environment. For each stage, the package can maintain a feature branch in a source code repository. The package provides the ability to version the artifacts in each branch and them to promote a version from one stage to another (e.g., GIT rebase). The managed package also manages the state and version of the package deployment in each of the stages. A package version can be deployed for a stage, where the parameters of the stage are used to provide values to properties that change when shifting stages.

A user space is a container for user-owned centralized and personalized preferences and resources to perform their data activities. A user space is created for every user on their first login to the project and are part of the project. A user space provides individual access to applications that are provisioned by the project thereby allowing a user to personalize and isolate their activity within the project. A user space is also used to identify the user activity as part of a project such as, for example, auditing and cost can be associated with a user space, or a lock for concurrency control on artifact can be associated with a user space.

A workspace is an immersive user interface that provides view and actions that a user needs to perform activities without leaving the interface. Examples of workspace include a SQL workbench that provides capabilities such as viewing the catalog of tables, performing SQL queries and visualizing the results, saving queries and results and sharing between users. Another example of a workspace is one that provides the ability to store and create new machine learning notebooks, execute cells containing code in various languages and visualizing results. Another example of a workspace is one that provides an analyst with a spreadsheet like interface to perform data preparation tasks and analysis with programming. Another example of a workspace is one that provides data stewards the ability to author, import, govern, and manage the metadata assets across the organization.

The system 100 can provide shared context across tool which allows users to use the tool suitable for the current activity. The shared context across a workspace includes any or all of: shared identity and permission using user identity and project context; ability to search, publish, and share data assets; ability to share artifacts; ability to share project internal resources; and ability to share user preferences and notifications Workspace can be open from a user portal or access directly through a hard-link (e.g., using a web browser). Each of the supported workspace can further be customized to present context of the system 100 and provide access to shared resources and capabilities of the connected environment.

The system 100 enables different user personas to collaborate easily and efficiently on data analytics and development. The ease and efficiency are enabled by the project concept described above. A project is a collaborative container where project members are able to collaborate, exchange data and code, and share a common set of capabilities and data permissions. While individual user activity is monitored, all users with the same user designation have the same capabilities and permissions while inside the project depending on their particular user designation. Every user with the same user designation can execute the same activities, access any data that is created inside the project, or access the authorized external data scoped by the project data policy to that user designation. A project can facilitate interactive sessions by users as well as programmatic production scripts that run inside the project can share the project permissions and notifications. A project can be ephemeral which exists only while serving a specific use case development, or permanent serving an organizational unit. The former is more secure than the latter as it can offer a limited access scope by time, data and user group, while the permanent solution requires less operational governance. A project is also a collaborative container for non-members to find data set producing spaces and interact with project members. For example, non-members can request access, request changes, or inquire about the data domain.

The project-based system 100 provides a solution that provides business users, data scientists, and data engineers a space that ties their data sources and projects in a unified way to allow different teams to share, communicate and build data products together. It introduces the project as a solution that satisfies security and cost management while providing users with freedom of operation and minimize boundaries to increase user's productivity. Projects are managed by project administrators who oversee provisioning projects as needed. To provision a project, the project operator defines the following: 1) a group of authorized users and their default user designations, 2) functional capabilities, 3) data access policy and 4) resource allocations. A user group controls the user access to the project. The group is typically controlled by an external SSO access group that is managed by the enterprise identity management system. Once the project user is authenticated, they are authorized to use any of the project capabilities, data access and resources depending on their user designations. The user can have designations like owner, contributor, or viewer. The owner can approve project and other requests in addition to the ability to perform all contributor actions. A contributor is mainly the project developers who can create, modify code or artifacts owned by Project. Viewers are only capable of viewing the artifacts produced by the project, but unable to create or modify any of them.

Some possible capabilities of various users associated with a project are:

(1) Project administrators can create, update, or delete projects. Project administrators can select and configure applications from registered applications when creating and updating projects. Project administrators can add users to a project.

(2) Project owners can approve and deny project join requests or requests from users to change their user designation.

(3) Project users can request to join project and request to change their user designation. Project users can join an open project. Project users can leave a project.

(4) All users can view all projects in the environment and projects that belong to them. All users can view details of a Project.

(5) Any authenticated user should be able to create individual projects.

A project simplifies users permission using project roles. A project can have different identity and access management (IAM) roles for different user designations (owner, contributor, and view). A project owner only needs to manage these role permissions and polices in the IAM service instead of having to manage individual user permissions.

As mentioned, when a user is added to a project, the user is assigned a designation. Whenever that user is operating with the project context, the project role corresponding to their designation is used to interact with other services in the provider network. For example, a user with the contributor designation uses the contributor role for the project and is authorized to perform only actions in the project context authorized by that role. The role can both grant and limit the user's permissions when operating in the project context.

Figure 2:
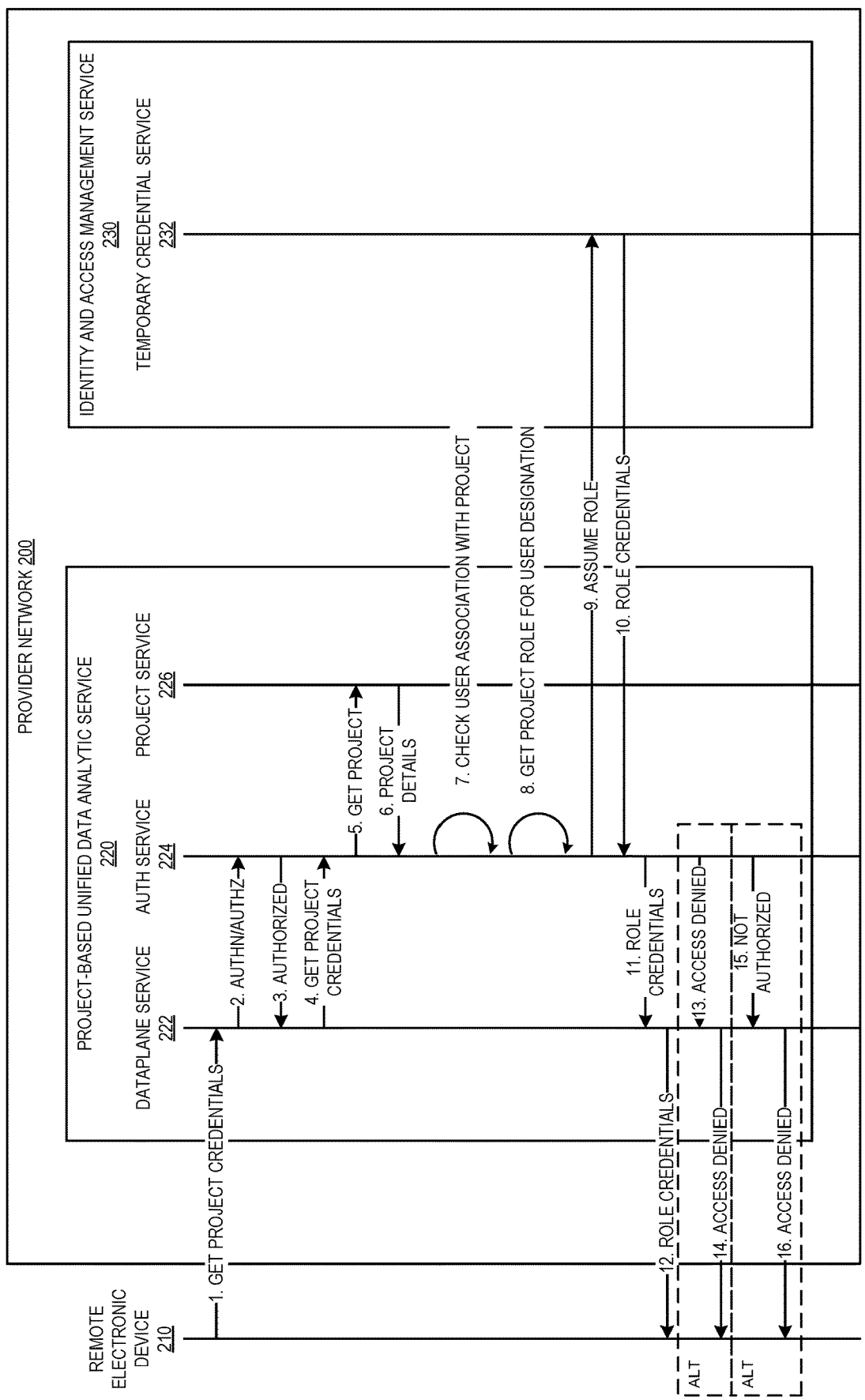
FIG. 2 is an interaction diagram illustrating an authorization process for project-based uniform data analytics in a provider network.

FIG. 2 illustrates how project roles are used to access provider network services in a provider network 200. The provider network 200 includes a project-based unified data analytic service 210 (equivalently "analytic service 210") and identity and access management service 220 (equivalently "IAM service 220"). The provider network 200 may contain other services. For example, the provider network 200 may encompass encompasses millions of servers around the world supporting hundreds of products and services that are used by users to build and deploy their computing applications and workloads.

The services offered to users by the provider network 200 can be varied. For example, the services offered by one popular provider network include virtualization services (equivalently "elastic computing services"), relational database services, data storage services, on-demand code execution services (equivalently "serverless code execution services"), content delivery network (CDN) services, machine-learning services, among other services. From the perspective of the provider network, users of the provider network are sometimes referred to as "customers."

Since the provider network 200 supports multiple customers on the same or shared infrastructure, identity and access management (IAM) 230 is essential. IAM 230 uses centrally managed fine-grained permissions to control who or what can access services and resources in the provider network 200. IAM 230 in the provider network 200 can operate under the principle of least privilege. Under this principle, an accessing entity should be granted only those permissions that are necessary to perform its intended function and no more (no greater) permission. Under this principle, a service in the provider network 200 is by default granted no permission or granted only very limited permission to access a resource in the provider network 200 provisioned to a customer. The customer must typically grant permission to the service to access the resource before the service can perform useful actions on the resource on behalf of the customer.

A service in the provider network 200 offers an application programming interface (API) that allows the functionality of the service to be accessed remotely, either: (1) by other services in the provider network 200 that are connected to the service by an intermediate network in the provider network 200 or (2) by remote devices (e.g., 210) that are connected to the provider network 200 by an intermediate network. An API encompasses a set of one or more data definitions and one or more network communication protocols for building and integrating services or devices. An API is a contract that represents an agreement between services or devices whereby if one service or device sends a remote request through an intermediate network structured in a particular way to another service or device, the other service or device will perform one or more particular actions and respond through the intermediate network in a particular way. For example, an API can be designed based on web standards such as using the Hyper Text Transfer Protocol (HTTP) or other suitable protocol for request messages and for providing a definition of the structure of response messages. A response message can take the form of a machine-readable data format such as extensible Markup Language (XML), JavaScript Object Notation (JSON), or any other suitable machine-readable data format. A protocol specification such as Simple Object Access Protocol (SOAP), Representation State Transfer (REST), GraphQL, or any other suitable protocol specification can be used to standardize information exchange via an API. An API can encompass a webhook (equivalently "reverse API" or "push API") which is a HTTP-based callback function that allows lightweight, event-driven communication between two APIs. Webhooks place the responsibility of communication on the service instead of the client. With a webhook, instead of the client sending HTTP requests asking for data, the server sends the client a single HTTP post request as soon as the data is available.

The above API standards and protocols are merely examples of some possible standards and protocols that can be used to implement an API of a service in the provider network 102. Other standards or protocols can be used according to the requirements of the particular service at hand. No particular standard or protocol is required of a service API in the provider network 102.

The provider network 200 offers various services to customers. Some possible services that the provider network 200 could provide include a virtualization service, a relational database service, a data storage service, an on-demand code execution service, a content delivery network (CDN) service, a machine-learning service, among other possible services. The foregoing list of services is merely one example of a set of services that could be offered by the provider network 102. The provider network 200 can offer different services. No particular service or set of services is required.

The virtualization service functions to allows customers to rent virtual computers on which to run their own computer applications. The virtualization service encompasses a web service through which a customer can boot and configure a virtual machine (equivalently an "instance") containing and configured with desired software. Using the web service, the customer can create, launch, or terminate instances as needed, paying for active instances. This capability to create, launch, and terminate instances as needed is sometimes referred to as "elastic" computing.

The relational database service is a distributed database service. The relational database service encompasses a web service that functions to simplify the tasks of setting up, operating, and scaling a relational database for use in customer applications. For example, the relational database service can facilitate administrative processes such as patching database software, backing up the database, enabling point-in-time recovery, or any other suitable relational database administrative task.

The data storage service provides data object storage through a web service interface. The data storage service can store any type of data object and manages data with an object storage architecture that provides scalability, high-availability, low latency access, and high durability. A basic storage unit is an object organized into "buckets." Each object is identifiable by a unique key and has a predetermined maximum size (e.g., five terabytes). A bucket can be managed remotely (e.g., from remote device 210) using a command line interface, a graphical user interface, or a software development kit.

The on-demand code execution service is an event-driven, serverless computing platform. The service executes software code in response to events and automatically manages the computing resources required by code execution. For example, the software code can be programmed in NODE.JS, PYTHON, JAVA, GO, RUBY, C #, or other suitable computer programming language. The service executes code as ephemeral instances. For example, each ephemeral instance can be an operating system container (equivalently a "zone," "virtual private service," "partition," "virtual environment," "virtual kernel," or "jail".). Each instance has access to a limited amount of random-access memory (RAM) (e.g., between 1,128 and 10,240 MB of RAM). Each instance is provided a limited amount of ephemeral data storage (e.g., between 512 MB to 10 GB) which is available only for the duration of the instance and its data contents are discard after the instance terminates. Each instance executes for a limited amount of time (e.g., between 1 and 900 seconds). In operation, a code package containing the code to be executed and up to a maximum compressed size is created or uploaded in the data storage service. For example, the maximum compressed size of the code package can be 50 MB. The on-demand code execution service is instructed (via an API offered by the on-demand code execution service) to download the package from the data storage service and run the contained code in response to an event. The on-demand code execution service can locally cache frequently run packages or code to avoid having to download them from the data storage service each time. Each instance runs in a new environment such that there is no or only limited access to the execution context of previous and subsequent executions of a code. As a result, each instance is essentially stateless, and input data and output data are stored with other services. For example, input data or output data for an instance can be stored with the data storage service or the relational database service.

The content delivery network (CDN) service provides a globally distributed network of proxy servers that cache content such as images, graphics, video, or audio data more locally to the remote electronic devices of customers and users thereby reducing latency for accessing (downloading) the content.

The machine-learning service functions to enable users to create, train, and deploy machine learning models. The machine learning service operates at different levels of complexity when training and deploying machine learning models. For example, the machine learning service may provide pre-trained machine learning model that can be deployed as is, provide built-in machine learning algorithms that customers can use to train a machine learning model, and provide managed instances of a machine learning framework (e.g., TENSORFLOW OR APACHE MXNET) that customers can use to create customer machine learning models.

The above services are just examples of possible services that may be offered by the provider network 200. The provider network 200 may offer different services or offer like services with different functionality or different implementation. No particular service, service functionality, or service implementation is required.

IAM service 230 functions to securely control access to resources in provider network 200 by authorizing "request" principals to perform actions on resources in the provider network 200. A request principal can include, but is not limited to, a role principal. When a "requesting" service in the provider network 200 sends a request (e.g., a HTTP or HTTPS request) to a "target" service in the provider network 200 to perform an action on a resource, IAM service 230 evaluates and authorizes the request based on a request context of the request. The request context can encompass data that specifies any or all of: the requested action to be performed, the resource being requested, the request principal (e.g., the role principal), environment data (e.g., information about a network address, user agent, SSL enabled status, or current date/time associated with requesting service sending the request), resource data (e.g., data related to the resource that is being requested such as a database table name or an identifier of a virtual machine instance), or any other suitable request context data.

If the requesting service has successfully assumed a role, then the requesting service obtains temporary security credentials from the IAM service 230 for the assumed role. For example, the temporary security credentials can include an access key identifier that identifies the temporary security credentials, an expiration which is the date/time at which the temporary security credentials expire, a secret access key that can be used to cryptographically sign requests as the role principal, and a session token that the requesting service passes to the target service to use the temporary security credentials. The request context of the request by the requesting service can include the session token of the temporary security credentials. Additionally or alternatively, the request or the request context is cryptographically signed using the secret access key of the temporary security credentials.

For authorization, IAM service 230 uses values from the request context to check for any polices that apply to the request. IAM service 230 then uses the applicable policies to determine whether to allow or deny the request. A policy is stored with IAM service 230 in a machine-readable format. For example, the machine-readable format can be JavaScript Object Notation (JSON), extensible Markup Language (XML), or the like. According to the principle of least privilege, IAM service 230 typically denies a request by default and an allow permission in a policy can override the default deny. If multiple polices apply to a request and one policy denies the request while another policy allows the request, then the deny overrides the allow and the request is denied by IAM service 230.

An IAM role (or just "role") is an IAM identity (or just "identity") that exists in IAM service 230, that is associated with a customer account, and that has specific permissions. Stated otherwise, a role is an identity encompassing a permission policy that determines what the identity can and cannot do on resources in the provider network 200 provisioned to the customer.

A role can be assumed by a service in the provider network 200 that needs it. For example, a service may assume a role to perform an action of a resource in the provider network 200 on behalf of a customer. A role does not have standard long-term credentials such as a password or access keys associated with it. Instead, when a service assumes a role, it is provided with temporary security credentials by temporary credential service 232. A role that a service assumes to perform an action of a resource in the provider network 200 provisioned to a customer is sometimes referred to herein as a "service" role. A service role includes permission required for the service to access the resources in provider network 200 it needs to carry out tasks on behalf of the customer.

A role has an identity referred to herein as a "role" principal. A role principal uniquely identifies the role in a string data format. A role principal of a role can be used to identify the role in a permission policy. For example, a role principal may take the data form of a Uniform Resource Name (URN), Universal Unique Identifier (UUID), or the like. However, no particular data format is required for a role principal. For example, a role principal can have a general resource naming format of:

"rn: <partition>: <service>: <region>: <account-id>: <resource-type>/<resource-id>."

Here, "rn" stands for "resource name" to indicate that what follows are components a resource name identifying a resource in the provider network 200. The <partition> component refers to a partition of the provider network 200 where the resource is located. The <service> component identifies a service in the provider network 200 to which the resource belongs. The optional <region> component identifies a geographic region of the provider network 200 where the resource is located. The <account-id> component is an identifier of the customer account that owns the resource or to which the resource is provisioned. The <resource-type> component identifies the type of resource. The <resource-id> component is an identifier of the resource.

The above role principal string data format is just one example of a possible string data format that can be used to identify roles within the provider network 200. Additionally or alternatively, other string data formats including those based on web standards such as the Uniform Resource Names (URNs) standard (Request for Comments (RFC) 8141) or the Universal Unique Identifier (UUID) standard (RFC 4122) can be used. No particular string data format is required and any string data format suitable for identifying a role managed by IAM service 230 can be used.

A role has a trust policy. A trust policy of a role defines the principals that are trusted to assume the role. A trusted principal can be a service principal. A role has a permission policy. A permission policy of a role defines what actions and resources the role can use.

As another example, the permission policy 124 of the delegation role 120 can define that the delegation role 120 is authorized to perform a set of actions on any resource under a certain condition 126. The condition 126 effectively requires that the delegation role 120 assume the customer role 114 with permission to perform the strict subset 138 of the set of actions 134 as defined by down scoping policy 136. An example of the permission policy 124 of the delegation role 120 including an example of the condition 126 is provided herein. In addition, an example of the down scoping policy 136 is provided herein.

The assuming service 106 acquires the permission to perform an action delegated to it (equivalently "a delegated action") by a role chaining process. In particular, the delegation role 120 is used by the assuming service 106 to assume the customer role 114 but with the down scoped permissions enforced by the condition 126 and the down scoping policy 136. The down scoped permissions limit the action or actions that can be performed by the assuming service 106 acting in the customer role 128 to the strict subset 138 of the set of actions 134. For example, the delegation role 120 can have permission to assume the customer role 114 subject to the condition 126. In this case, the assuming service 106 can first assume the delegation role 120. Then, with the temporary credentials of the delegation role 120, the assuming service 106 can assume the customer role 114 subject to the condition 126.

IAM service 110 functions to securely control access to resources in provider network 102 by authorizing "request" principals to perform actions on resources in the provider network 102. A request principal can include, but is not limited to, a role principal. When a "requesting" service (e.g., assuming service 106) in the provider network 102 sends a request (e.g., a HTTP or HTTP request) to a "target" service (e.g., a service that provides access to customer resource 108) in the provider network 102 to perform an action on a resource (e.g., resource 108), IAM service 110 evaluates and authorizes the request based on a request context of the request. The request context can encompass data that specifies any or all of: the requested action to be performed, the resource being requested, the request principal (e.g., the role principal), environment data (e.g., information about a network address, user agent, SSL enabled status, or current date/time associated with requesting service sending the request), resource data (e.g., data related to the resource that is being requested such as a database table name or an identifier of a virtual machine instance), or any other suitable request context data.

Temporary credential service 232 of IAM service 230 provides an API that allows a service in the provider network 200 to assume a role. To assume a role, the assuming service makes an assume role request of the temporary credential service 232. If the assume role request is successful, then the temporary credential service 232 returns temporary security credentials for the assumed role.

The assume role request accepts a number of request parameters including, among other possible parameters, a "role session duration" parameter and a "role identifier" parameter. The role session duration parameter specifies the duration (e.g., in seconds) of validity of the temporary security credentials for the assumed role that are returned by the temporary credential service 232. If no value is provided for the role session duration parameter in the assume role request, then a default duration (e.g., 3600 seconds) is used by the temporary credential service 232 when generating the temporary security credentials to return to the requesting service. A minimum allowed duration (e.g., 900 seconds) and a maximum allowed duration (e.g., 432000 seconds) constrain the possible values for the role session duration parameter. After the validity period has passed, the requesting service can no longer use the temporary security credentials to perform actions in the assumed role. The requesting service must issue a new assume role request to the temporary credential service 232 to obtain a new set of temporary security credentials for the assumed role with an updated validity period. The role identifier parameter specifies the role principal of the role to assume.

When the assuming service makes an assume role request, the assuming service 232 can specify a set of session tags. A session tag is a key-value pair. Also, when the assuming service makes an assume role request, the assuming service cryptographically signs the request using a secret cryptographic key that represents an identity of the assuming service. For example, the assuming service can sign the assume role request using a secret key associated with the assuming service account. By doing so, the temporary credential service 232 authenticates the assume role request and determines that the assume role request is being made by the assuming service account.

The analytic service 220 offers a GetProjectCredentials API. The API enables users and remote devices (e.g., 210) to acquire temporary security credentials for their project role. The remote device 210 sends (Step 1) a request of the GetProjectCredentials API. The request specifies an identifier of a target project. The request is received at a data plane service 222 of the analytic service 220. The data plane service 222 requests an auth service 224 of the analytic service 220 to authenticate and authorize (Step 2) the user of the remote device 210. In the scenario of FIG. 2, the identity of the user may be established by an external single sign-on portal (external to provider network 100). After successful authentication and authorization of the user (Step 3), the data plane service 222 requests (Step 4) auth service 224 to get credentials for the target project. In response, the auth service 224 gets (Step 5) information about the target project from a project service 226 of the analytic service to 220. Details about the target project are returned (Step 6) to the auth service 224. Using the returned details about the target project, the auth service 224 checks (Step 7) that the user is associated with the target project. Also using the returned details about the target project, the auth service 224 determines (Step 8) the user designation and the project role for the user designation. Having established the role corresponding to the user designation, the auth service 224 makes (Step 9) an assume roll call of the temporary credential service 232. The temporary credential service 232 returns (Step 10) credentials for the role. These temporary credentials for the role are returned (Steps 11 and 12) to the user's device 210. If the user is not associated with the project or the user is not authorized to get the project credentials, then access to the project is denied to the user (Steps 13-16).

Figure 3:
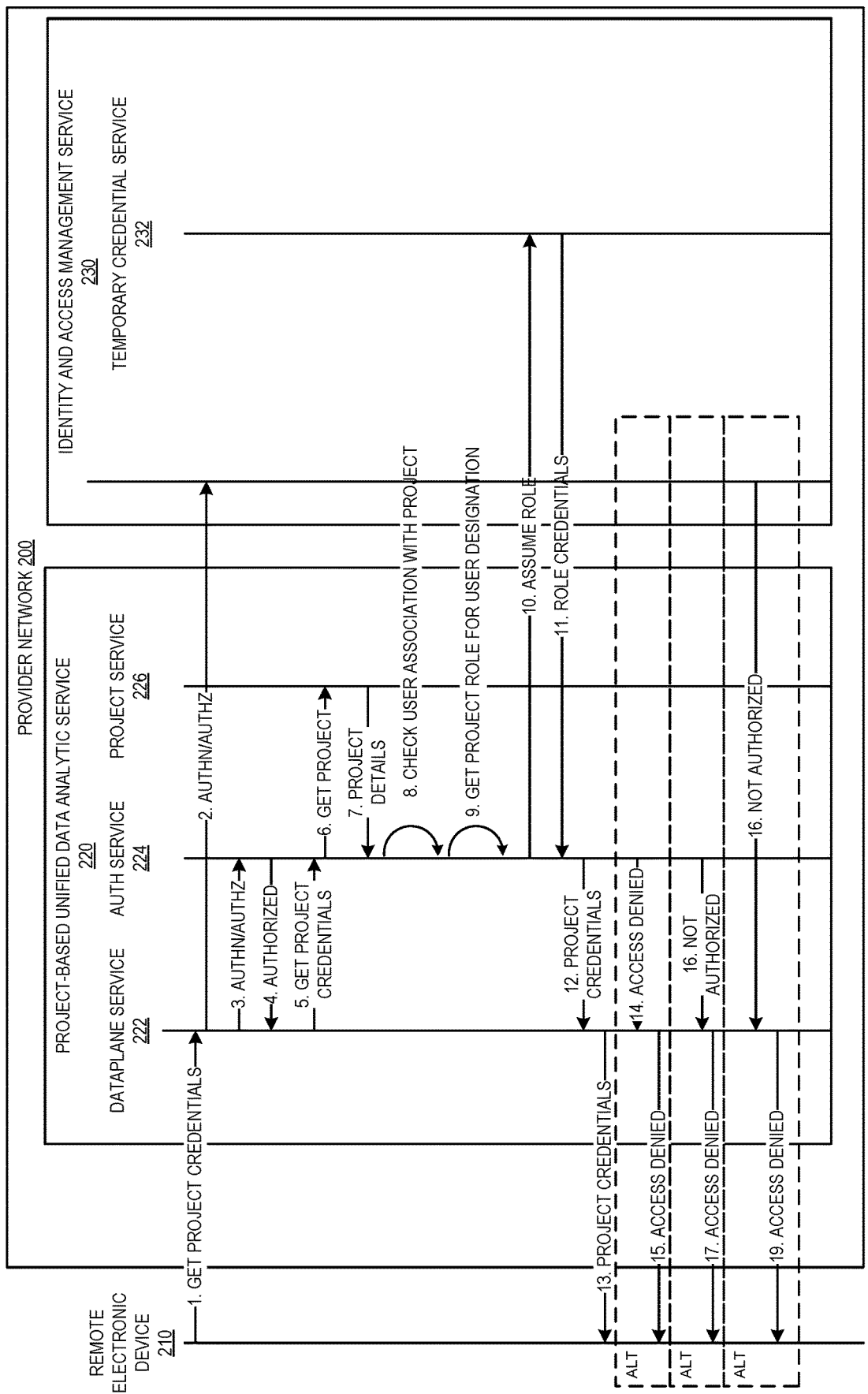
FIG. 3 is an interaction diagram illustrating an authorization process for project-based uniform data analytics in a provider network.

The scenario of FIG. 3 is like the scenario of FIG. 2 except that the user's individual identity is established (Step 2) by authentication with the identity and access management service 230 instead of by an external SSO portal. The identity and access management service 230 may also authorize (Step 2) the user. If the user is authenticated and authorized (Step 2) by the IAM service 230, then scenario proceeds as with the scenario of FIG. 2. However, if the user is not successfully authenticated or successfully authorized by the IAM service 230, then the user is denied access to the project (Steps 18-19).

Figure 4:
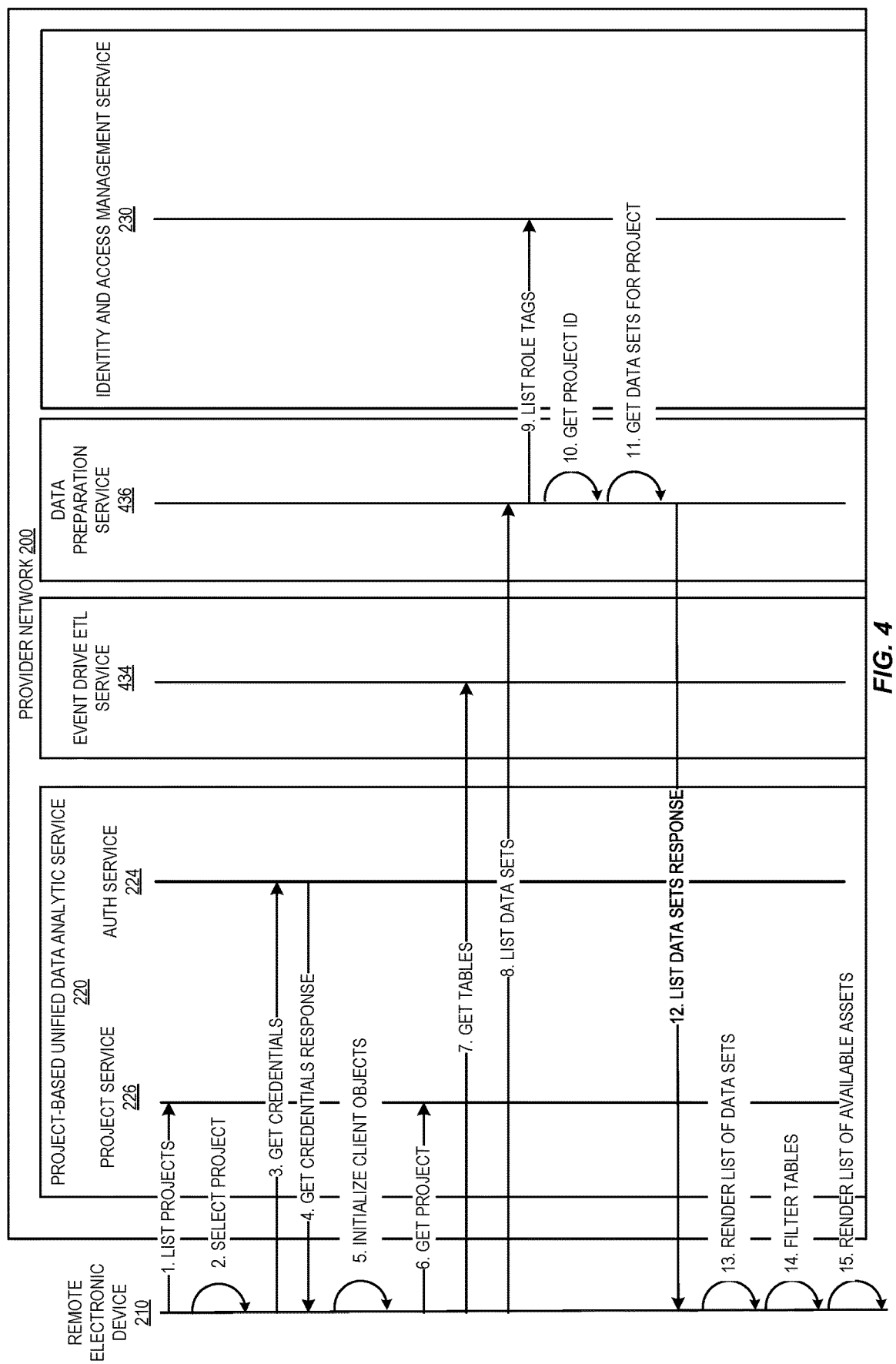
FIG. 4 is an interaction diagram illustrating an integration process for project-based uniform data analytics in a provider network.

FIG. 4 illustrates integration between analytic service 220 and an event driven ETL service 434 and a data preparation service 436. Significantly, the temporary security credentials for the project role corresponding to the user designation are returned to the remote device 210 of the user. The temporary security credentials can be temporarily cached at the remote device 210 (e.g., in a web browser cache) and used to access services in the provider network 200 such as the event driven ETL service 434 and the data preparation service 436 with the permissions granted to the user designation role for the project.

Initially, a user may use a web browser or other graphical user interface-based application at the device 210 to navigate to a graphical user interface console for a service in the provider network 200. For example, the user may navigate to a graphical user interface console for the data preparation service 436. The data preparation service 436 may provide capabilities enabling users to visually prepare data for data analytics or machine learning. Such capabilities may include the ability of users to visually clean and normalize data to prepare it for analytics and machine learning. The data preparation service 436 provides pre-build transformations to automate data preparation tasks without the need of the user to write low-level programming language code or general-purpose programming language code. Capabilities provided the data preparation service 436 to users may include automating the filtering of anomalies from data, converting data to standard formats, correcting invalid values in data, or any other data preparation task suitable for data analytics or machine learning.

At step 1, the console application at the device 210 sends a request to the project service 226 of the analytic service 220 to list the projects to which the user is associated. The list of projects is returned to the console application and the list is displayed to the user at the device 210. At step 2, the user selects one (the "target project") of the listed projects using the GUI console. At step 3, the console application requests the auth service 224 of the analytic service 220 for the project credentials for the user for the target project. At step 4, the project credentials for the user for the target project are returned to the device 210. The project credentials can include the temporary security credentials vended by IAM service 230 for the role corresponding to the user's designation in the target project. At step 5, client data objects at the device 210 are initialized. At step 6, information about the target project is fetched from the project service 226.

Event driven ETL service 434 is a serverless data integration service that makes it easier for users to discover, prepare, move, and integrate data from multiple data sources in provider network 200 for analytics, machine learning (ML), and application development. Event driven ELT service 434 may manage a set of tables in a catalog. A table in the catalog includes a metadata definition that represents the data in a data source. The console application uses the metadata to create and display visualizations of the data. The metadata is also used by ETL jobs executed by the service 434 such as by specifying the source and target data sources in the provider network 200 of the ETL jobs. At step 7, the console application at device 210 requests the event driven ETL service 343 to get a set of tables associated with the target project. At step 8, the console application at device 210 requests the data preparation service 436 to lists a set of data sets associated with the target project. At step 9, the data preparation service 436 requests the IAM service 230 to list a set of role tags 230 associated with the target project. At step 10, the data preparation service 436 get the identifier of the target project. At step 11, the data preparation service 45 uses the target project identifier to get a set of data sets associated with the target project. At step 12, the set of data sets associated with the target project are returned to the console application at the user's device 210. At step 13, the set of data sets associated with the target project are presented in a GUI at the user's device 210. At step 14, the set of tables associated with the target project are filtered. The filtering removes tables in the set of tables that are already connected to a data set in the set of data sets associated with the target project. At step 15, a list of project assets is presented in the console application GUI. The list of project assets includes the set of data sets associated with the target project and the tables in the set of tables associated with the target project that are not connected to a data set.

The analytic service 220 supports the notion of a project. A project provides a secure and contained environment for users to collaborate and share across services in the provider network 200. One of the mechanisms used to facilitate this and to provide containment is tagging resources in the provider network 200 created from and within a project. The tags are used for enforcing project authorization and for filtering project resources. A tag can be a key value pair, for example.

Figure 5:
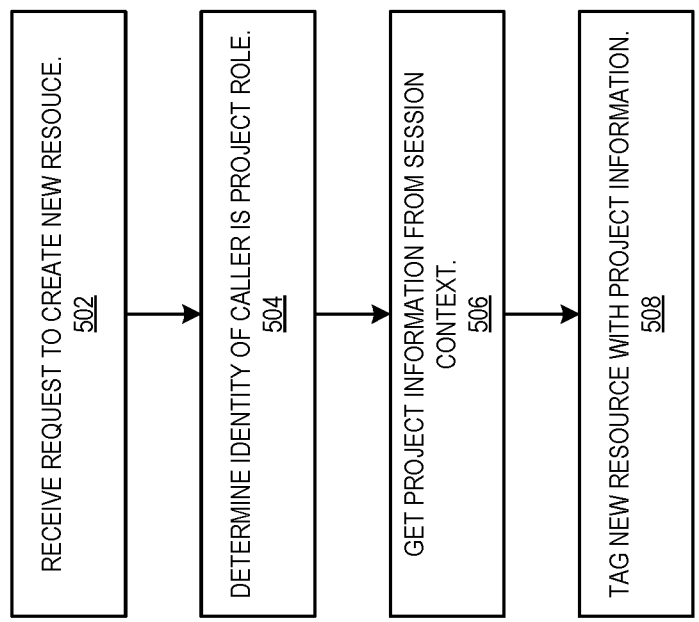
FIG. 5 is a flowchart of a tag-on-create method for project-based uniform data analytics in a provider network.

A service in the provider network 200 that integrates with the analytic service 220 tags resources that are created within the context of a project. In other words, the service tags resources that are created using project role credentials. FIG. 5 illustrates a tag on create method performed by a service in the provider network 200 that is integrated with the analytic service 220. At step 502, the integrated service receives a request to create a new resource. At step 504, the integrated service determines that the request to create the new resource is being made under a project role identity. At step 506, information about the target project is obtained from session information. At step 508, the new resource is tagged. That is, and identifier of the resource is associated with a set of one or more key value pairs (i.e., tags). For example, the new resource can be associated with the set of key value pairs in a tagging database or other suitable key value data store. At least one of the tags associated with the new resource can be A tag that identifies a project to which the new resource is associated. A resource can be associated with multiple projects. Hence a resource can be associated with multiple tags identifying the multiple projects with which the resource is associated.

Figure 6:
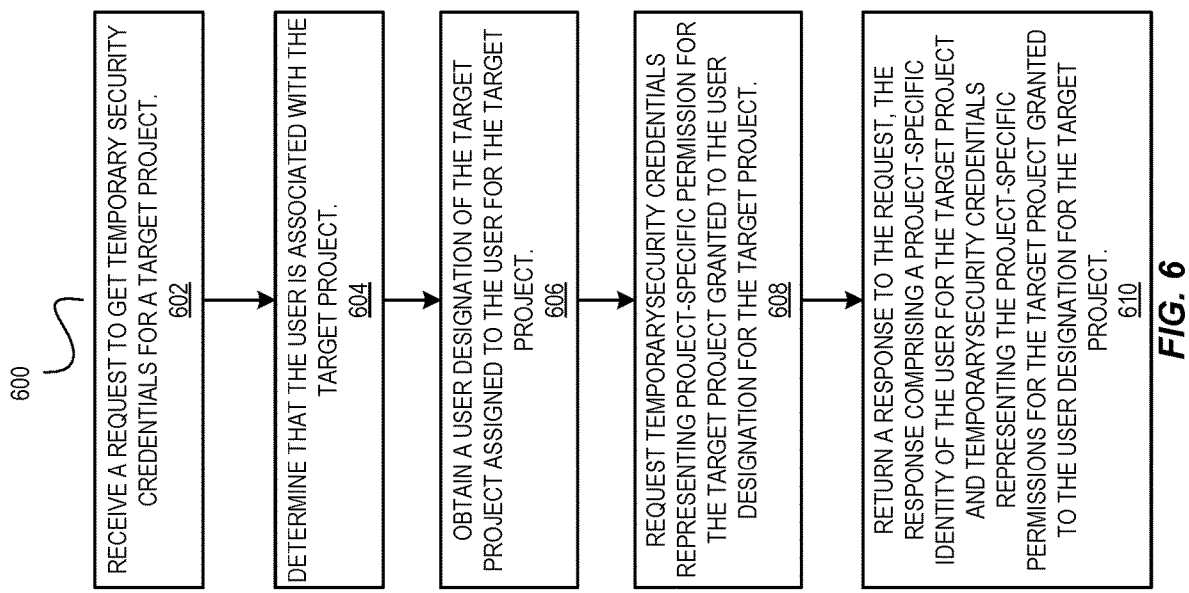
FIG. 6 is a flowchart of a method for project-based uniform data analytics in a provider network.

FIG. 6 is a flowchart of a method 600 for project-based unified data analytics in a provider network. At step 602, a project-based unified data analytics service ("analytics service") receives a request to get temporary security credentials for a target project. The request is sent from a remote electronic device of a user. The request may identify the target project (e.g., by a project ID). The request may also be associated with an identity of the authenticated user. The user can be authenticated in a variety of ways including by an identity and access management service in the provider network. Additionally or alternatively, the user can be authenticated by an external identity provider (external to the provider network) such as, for example, an external single sign-on (SSO) portal, an external database service, an Active Directory instance, a Lightweight Directory Access Protocol (LDAP) instance, or other external identity provider. Note that if the user is not authenticated when the request is received, the user can be challenged to authenticate before the method proceeds.

At step 604, the analytics service determines whether the authenticated user is associated with the target project. For example, the analytics service can determine whether the authenticated user is an administrator or owner of the target project, is a member of the target project, or is assigned a user designation for the target project. If the user is not associated with the target project, then the user is denied access to the target project and an appropriate response is returned to the user's remote electronic device. If the user is associated with the target project, then the method proceeds to step 606.

At step 606, a user designation of the target project that is assigned to the authenticated user is obtained. For example, the user designation can be an owner, contributor, or viewer of the target project.

At step 608, the analytics service request temporary security credentials representing project-specific permissions for the target project that are granted to the user designation for the target project. The mapping of individual users to user designations simplifies permission management for the project as permissions need only be determined and managed at the coarser user designation level instead of an individual user by individual user basis. The analytics service can request the temporary security credentials from a temporary credential service of an identity access and management service in the provider network. Additionally, or alternatively, the analytics service can request the temporary security credentials from an external identity provider such as an external single sign-on (SSO) portal, an external database service, an Active Directory instance, a Lightweight Directory Access Protocol (LDAP) instance, or other external identity provider.

At step 610, a response to the request to get project credentials (602) is returned to the user's remote electronic device. The response includes a project-specific identity of the user for the target project and temporary security credentials representing the project-specific permissions for the target project granted to the user designation for the target project. Note that the response includes the user's individual identity in the context of the target project (i.e., a target project specific identity). By doing so, actions taken by the user in the context of the target project can be audited and logged in a way that the actions are attribute to the user. At the same time, the permissions the user has to take actions in the context of the target project are granted by the user designation assigned to the user. Thus, the solution allows individualized auditing of project actions yet also simplifies permission management by way of and in terms of the user designations.

Figure 7:
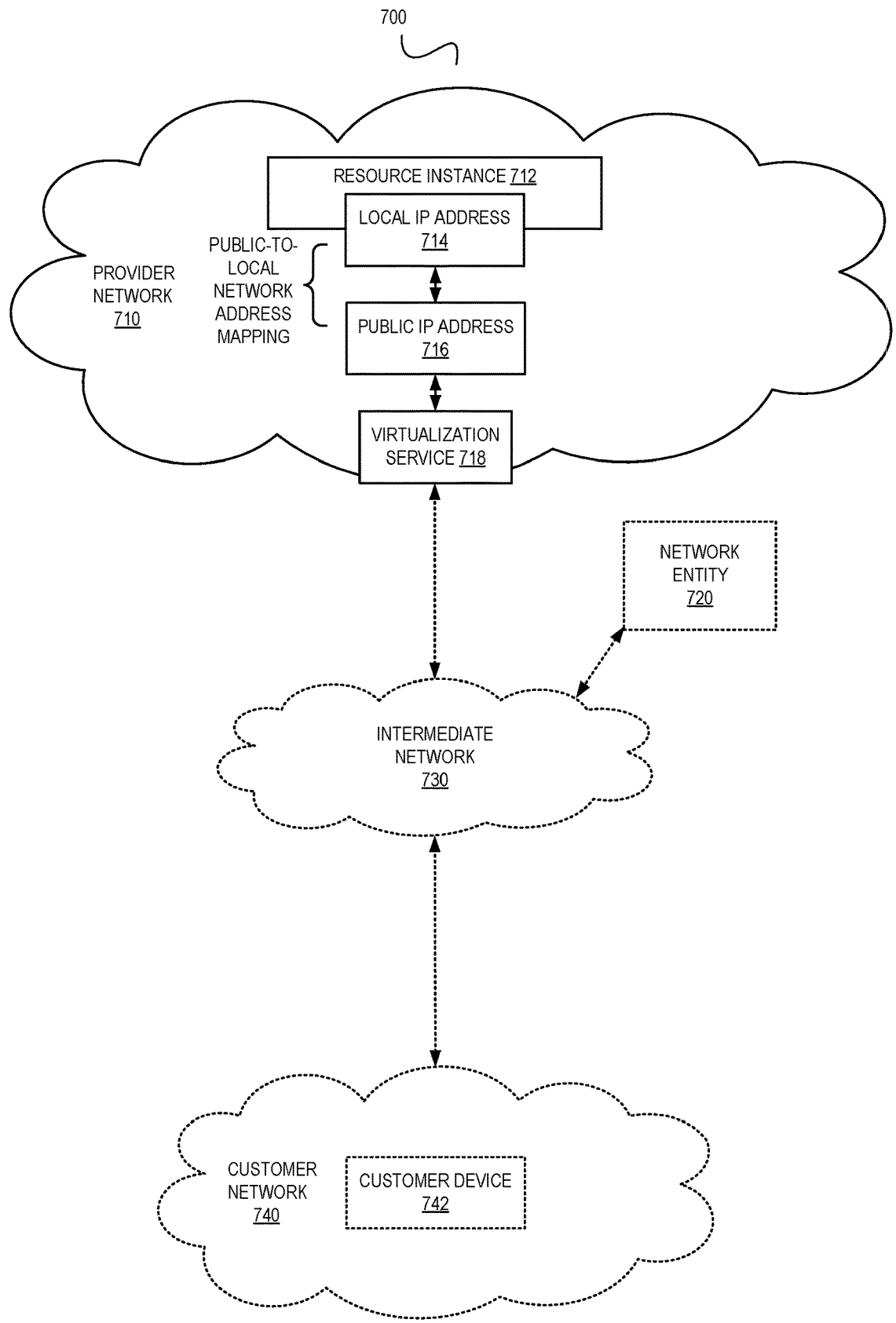
FIG. 7 illustrates a provider network environment in which the techniques disclosed herein can be implemented.

FIG. 7 illustrates a provider network environment 700 in which the techniques disclosed herein can be implemented. The environment 700 includes a provider network 710 and optionally an intermediate network 730 and a customer network 740. While the intermediate network 730 and the customer network 740 are depicted in FIG. 7 as being external to the provider network 710, the intermediate network 730 and the customer network 740 can alternatively be internal to (within) the provider network 710. The provider network 710 provides resource virtualization to a customer of the provider network 710 via a virtualization service 718. The virtualization service 718 allows the customer to purchase, rent, subscribe to, or otherwise obtain use of one or more resources (e.g., resource 712).

The resource 712 can be a compute, storage, or network resource. The resource 712 can be implemented by an electronic device in a datacenter within the provider network 710. The datacenter can be a physical facility or building that houses compute, storage, and network infrastructure. The provider network 710 can encompass many resources implemented by many electronic devices distributed over a set of datacenters located in different geographic regions or locations. An example of an electronic device is device 800 described below with respect to FIG. 8.

The resource 712 can be a virtual machine (VM) or a container. A virtual machine is a compute resource that uses software instead of a physical computer to run a program and deploy an application. A virtual machine (sometimes called a "guest machine") can run on a single physical machine (sometimes called the "host machine"). A virtual machine can execute its own operating system (e.g., UNIX, WINDOWS, LINUX, etc.) and can function separately at least in part from other virtual machines, including those on the same host machine. A virtual machine can be a substitute for a physical machine. A host machine's physical resources can be shared between multiple virtual machines each running its own copy of an operating system. Access to and use of the host machine's physical resources (e.g., hardware processor and physical memory resources) by the multiple virtual machines can be coordinated by a virtual machine monitor (sometimes called a "hypervisor"). The hypervisor itself can run on the bare hardware of the host machine or as a process of an operating system that runs on the bare hardware.

A container is like a virtual machine with respect to running separate applications on a single platform. However, a container typically encapsulates a single application or a set of one or more related applications along with runtime dependencies and libraries, while a virtual machine virtualizes the hardware to create a "computer." Another difference is that a container system typically provides the services of an operating system kernel that runs on the bare hardware of the underlying host machine to containers that share the kernel services as orchestrated by the container system. The container system itself can run on the host machine with the aid of the operating system kernel and can isolate the containers from each other to a certain degree. While a container can be used independently of a virtual machine, a container and a virtual machine can be used together. For example, a container can run on an operating system that runs on a virtual machine that runs on a host machine.

Within the provider network 710 a local Internet Protocol (IP) address 714 is associated with the resource 712. The local IP address 714 includes an internal or private network address in the provider network 710. The local IP address 714 can be an IPV4 or IPv6 address, for example. For example, the local IP address 714 can be one reserved by Internet Engineering Task Force (IETF) Request for Comments (RFC) 1918 or having an address format specified by IETF RFC 4193 and can be mutable within the provider network 710.

Network traffic originating from a network entity 720 coupled to the intermediate network 730 or from a customer device 742 in the customer network 740 that is destined for the resource 712 in the provider network 710 typically is not directly routed to the local IP address 714. Instead, the network traffic is addressed to a public IP address 716. The public IP address 716 can be mapped within the provider network 710 to the local IP address 714 using network address translation (NAT) or similar technology.

Using the customer device 742 in the customer network 740, the customer uses, controls, operates, or benefits from the virtualization service 718, the resource 712, the local IP address 714, and the public IP address 716 to implement a customer-specific application and offer the application to one or more network entities (e.g., network entity 720) on the intermediate network 730. The network entity 720 can generate network traffic destined for the application by addressing the network traffic for the public IP address 716. The traffic can be routed via the intermediate network 730 to the datacenter of the provider network 710 which houses the electronic device that implements the resource 712. Within the data center, the traffic can be routed to the local IP address 714 where the traffic is received and processed by the resource 712. Response network traffic from the resource 712 can be routed back onto the intermediate network 730 to the network entity 720.

Figure 8:
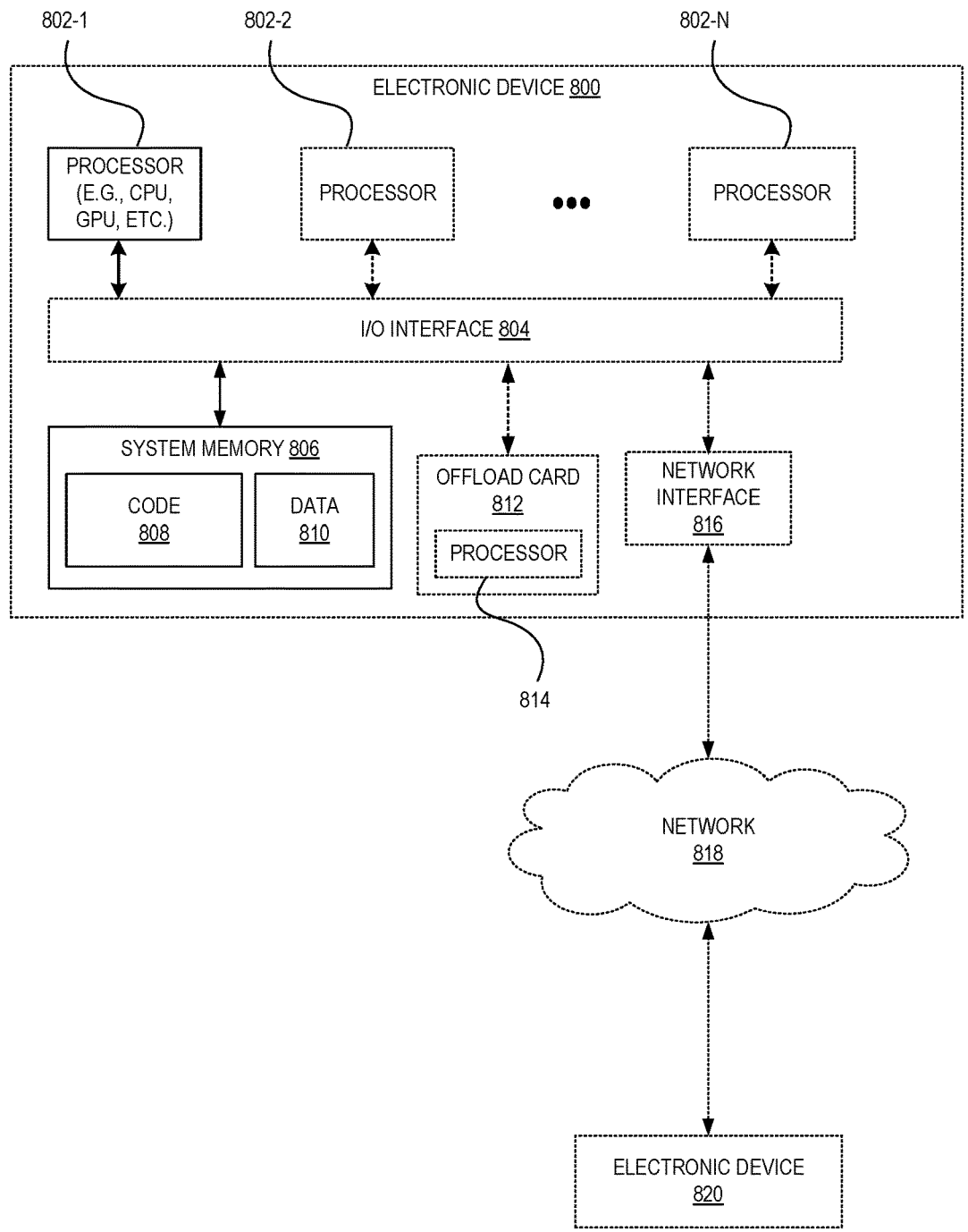
FIG. 8 illustrates an electronic device that can be used in an implementation of the techniques disclosed herein.

FIG. 8 illustrates an electronic device 800 that can be used in an implementation of the techniques disclosed herein. Device 800 includes a set of one or more processors 802-1, 802-2, . . . , 802-N coupled to system memory 806 via an input/output (I/O) interface 804. The device 800 can further include a network interface 816 coupled to the I/O interface 804.

The device 800 can be a uniprocessor system including one processor or can be a multiprocessor system including multiple processors. Each of processors 802-1, 802-2, . . . , 802-N can be any suitable processor capable of executing instructions. For example, each of the processors 802-1, 802-2, . . . , 802-N can be general-purpose or embedded processor implementing any of a variety of instruction set architectures (ISAs), such as the X86, ARM, POWERPC, SPARC, or MIPS ISAs, or any other suitable ISA.

The system memory 806 stores instructions and data accessible by the processor(s) 802-1, 802-2, . . . , 802-N. The system memory 806 is implemented using any suitable memory technology, such as random-access memory (RAM), static RAM (SRAM), synchronous dynamic RAM (SDRAM), nonvolatile or Flash-type memory, or any other type of memory. Program instructions 808 and data 810 implementing a desired function, such as a method, process, act, or operation of the techniques disclosed herein, are stored within the system memory 806 as code 808 (e.g., executable to implement, in whole or in part, a method, process, act, or operation performed by analytic service 220) and data 810.

The I/O interface 804 is configured to coordinate I/O traffic between the processor(s) 802-1, 802-2, . . . , 802-N, the system memory 806, and any peripheral devices in device 800, including, optionally, a network interface 816 or other peripheral interfaces (not shown). The I/O interface 804 performs any necessary protocol, timing, or other data transformations to convert data signals from one component (e.g., the system memory 806) into a format suitable for use by another component (e.g., the processor(s) 802-1, 802-2, . . . , 802-N).

The I/O interface 804 can include support for devices attached through various types of peripheral buses, such as a variant of the PERIPHERAL COMPONENT INTERCONNECT (PCI) bus standard or the UNIVERSAL SERIAL BUS (USB) standard, for example (e.g., a bus implementing a version of the PERIPHERAL COMPONENT INTERCONNECT-EXPRESS (PCI-E) standard, or another interconnect such as a QUICKPATH INTERCONNECT (QPI) or ULTRAPATH INTERCONNECT (UPI)). The function of the I/O interface 804 can be split into two or more separate components, such as a north bridge and a south bridge, for example. Also, some of the functionality of the I/O interface 804, such as an interface to the system memory 806, can be incorporated directly into the processor(s) 802-1, 802-2, . . . , 802-N.

An optional network interface 816 is configured to allow data to be exchanged between device 800 and another electronic device 820 attached to device 800 via a network 818. The network interface 816 supports communication via any suitable wired or wireless networks, such as a type of wired or wireless Ethernet network, for example. Additionally, the network interface 816 can support communication via telecommunications or telephony networks, such as analog voice networks or digital fiber communications networks, via storage area networks (SANs), such as FIBRE CHANNEL SANS, or via any other suitable type of network or protocol.

The device 800 optionally includes an offload card 812 including a processor 814, and possibly including a network interface (not depicted), that is connected using the I/O interface 804. For example, device 800 can act as a host electronic device (e.g., operating as part of a hardware virtualization service) that hosts compute resources such as compute instances, and the offload card 812 can execute a virtualization manager that can manage compute instances that execute on the host electronic device 800. As an example, the offload card 812 can perform compute instance management operations, such as pausing or un-pausing compute instances, launching or terminating compute instances, performing memory transfer/copying operations, etc. These management operations can be performed by the offload card in coordination with a hypervisor (e.g., upon a request from a hypervisor) that is executed by the processor(s) 802-1, 802-2, . . . , 802-N of device 800. However, the virtualization manager implemented by the offload card 812 can accommodate requests from other entities (e.g., from compute instances themselves).

The system memory 806 encompasses one or more computer-accessible media configured to store program instructions 808 and data 810. However, program instructions 808 or data 810 can be received, sent, or stored upon different types of computer-accessible media. Computer-accessible media includes non-transitory computer-accessible media and computer-accessible transmission media. Examples of non-transitory computer-accessible media include volatile or non-volatile computer-accessible media. Volatile computer-accessible media includes, for example, most general-purpose random-access memory (RAM) including dynamic RAM (DRAM) and static RAM (SRAM). Non-volatile computer-accessible media includes, for example, semiconductor memory chips capable of storing instructions or data in floating-gate memory cells composed of floating-gate metal-oxide-semiconductor field effect transistors (MOSFETs), including FLASH memory such as NAND flash and solid-state drives (SSD). Other examples of non-volatile computer-accessible media include read-only memory (ROM), erasable programmable ROM (EPROM), electrically erasable programmable ROM (EEPROM), ferroelectric RAM, and other computer data storage devices (e.g., disk storage, hard disks drives, optical discs, floppy disks, and magnetic tape).

Ordinal terms such as first, second, etc. may be used in the foregoing description and in the appended claims to describe various elements, features, acts, or operations. Unless the context clearly indicates otherwise, such elements, features, acts, or operations are not limited by those terms. The terms are used only to distinguish one element, feature, act, or operation from another. For example, a first device could be termed a second device. The first device and the second device are both devices, but they are not the same device.

Unless the context clearly indicates otherwise, as used in the foregoing description and in the appended claims, the singular forms "a," "an," and "the" are intended to include the plural forms as well.

Unless the context clearly indicates otherwise, as used in the foregoing description and in the appended claims, the terms "comprising," "including," "having," "based on," "encompassing," and other like terms, are used in the foregoing description and in the appended claims in an open-ended fashion, and do not exclude additional elements, features, acts, or operations.

In the case of "based on," the term is used in the foregoing description and in the appended claims in some instances to identify a causal relationship between stated steps, acts or operations. Unless the context clearly indicates otherwise, "A based on B" in these instances means that the performance of step, act, or operation B causes the performance of step, act, or operation A. The causal relationship can be direct (via no intermediate steps, acts, or operations) or indirect (via the performance of one or more intermediate steps, acts, or operations). However, unless the context clearly indicates otherwise, the term "A based on B" is not intended to require the performance of B be necessary in all cases to cause the performance of A, and A may be performed in some cases without being caused by the performance of B. In those cases, however, A would not be based on B even though A is based on B in other cases. Further, unless the context clearly indicates otherwise, the term "A based on B" is not intended to require that the performance of B by itself be sufficient in all cases to cause the performance of A, and one or more other steps, acts, or operations in addition to B may be performed in some cases to cause the performance of A. In such circumstances, A can still be based on B even though multiple steps, acts, or operations including B are performed to cause A.

Unless the context clearly indicates otherwise, the term "or" is used in the foregoing description and in the appended claims in its inclusive sense (and not in its exclusive sense) so that when used, for example, to connect a list of elements, features, acts, or operations, the term "or" means one, some, or all the elements, features, acts, or operations in the list.

Unless the context clearly indicates otherwise, conjunctive language in the foregoing description and in the appending claims such as the phrase "at least one of X, Y, and Z," is to be understood to convey that an item, term, etc. can be either X, Y, or Z, or a combination thereof. Thus, such conjunctive language does not require that at least one of X, at least one of Y, and at least one of Z to each be present.

It will be clear to one skilled in the art that the above embodiments may be altered in many ways without departing from the scope of the invention. Accordingly, the scope of the invention should be determined by the following claims and their legal equivalents.

What is claimed is:

1. A method comprising:
   receiving, by a project-based unified data analytics service in a provider network, a request to get temporary security credentials for a target project, the request associated with an authenticated identity of a user, the project-based unified data analytics service implemented by a set of one or more electronic devices;
   determining that the user is associated with the target project;
   obtaining a user designation of the target project assigned to the user for the target project;
   receiving, from a temporary credential service in the provider network, temporary security credentials representing project-specific permissions for the target project granted to the user designation for the target project; and
   returning a response to the request, the response comprising a project-specific identity of the user for the target project and the temporary security credentials representing the project-specific permissions for the target project granted to the user designation for the target project.

2. The method of claim 1, wherein the target project is isolated from one or more other projects in that the temporary security credentials grant permission to only resources associated with the target project and not to resources that are not associated with the target project.

3. The method of claim 1, wherein the authenticated identity of the user is established by an external identity provider, the external identity provider external to the provider network.

4. A method comprising:
receiving a request to get temporary security credentials for a target project, the request associated with an authenticated identity of a user;
determining that the user is associated with the target project;
obtaining a user designation of the target project assigned to the user for the target project;
receiving temporary security credentials representing project-specific permissions for the target project granted to the user designation for the target project; and
returning a response to the request, the response comprising a project-specific identity of the user for the target project and temporary security credentials representing the project-specific permissions for the target project granted to the user designation for the target project.

5. The method of claim 4, further comprising:
requesting the temporary security credentials from an external identity provider, the external identity provider external to a provider network.

6. The method of claim 4, further comprising:
auditing an action taken by the user in context of the target project including storing an entry in an audit log, the entry indicating the project-specific identity of the user for the target project and indicating the action taken by the user in context of the target project.

7. The method of claim 4, wherein the user designation is one of an owner of the target project, a contributor to the target project, or a viewer of the target project.

8. The method of claim 4, wherein the temporary security credentials comprise an access key, a secret access key, and a session token.

9. The method of claim 4, further comprising:
receiving a request to create a new resource in a provider network;
determining that an identity associated with the request to create the new resource is associated with the target project; and
associating the new resource with an identifier of the target project.

10. The method of claim 9, wherein the new resource is a compute resource, a storage resource, or a security resource.

11. The method of claim 4, further comprising:
receiving temporary security credentials representing project-specific permissions for the target project granted to a service in a provider network for the target project; and
the service in the provider network performing actions on a resource in the provider network using the project-specific permission for the target project granted to the service.

12. The method of claim 4, wherein receiving temporary security credentials representing the project-specific permissions for the target project granted to the user designation for the target project is based on:
sending an assume role request to a temporary credential service in a provider network; and
receiving, from the temporary credential service, the temporary security credentials representing the project-specific permissions for the target project granted to the user designation for the target project.

13. The method of claim 4, further comprising:
causing display at a remote electronic device of the authenticated user a list of projects with which the authenticated user is associated including causing display of graphical user interface controls for selecting a project from the list of projects; and
receiving the request to get temporary security credentials for the target project in response to a user selection via the graphical user interface controls of the target project from the list of projects.

14. The method of claim 4, further comprising:
causing display at a remote electronic device of the authenticated user a set of resources that belong to the target project.

15. A system comprising:
a first one or more electronic devices to implement a project-based unified data analytics service in a provider network, the analytics service comprising instructions which when executed cause the analytics service to:
receive a request to get temporary security credentials for a target project, the request associated with an authenticated identity of a user;
determine that the user is associated with the target project;
obtain a user designation of the target project assigned to the user;
receive, from a temporary credential service in the provider network, temporary security credentials representing project-specific permissions for the target project granted to the user designation for the target project; and
return a response to the request, the response comprising a project-specific identity of the user for the target project and comprising the temporary security credentials representing project-specific permissions for the target project granted to the user designation for the target project;
a second one or more electronic devices to implement the temporary credential service in the provider network, the temporary credential service comprising instructions which when executed cause the temporary credential service to:
send the temporary security credentials representing the project-specific permissions for the target project granted to the user designation for the target project.

16. The system of claim 15, the analytics service further comprising instructions which when executed cause the analytics service to:
audit an action taken by the user in context of the target project including storing an entry in a log, the entry indicating the project-specific identity of the user for the target project and indicating the action taken by the user in context of the target project.

17. The system of claim 15, further comprising:
an integrated service in the provider network implemented by one or more electronic devices, the integrated service comprising instructions which when executed cause the integrated service to:
receive a request to create a new resource in the provider network;
determine that an identity associated with the request to create the new resource is associated with the target project; and
associate the new resource with an identifier of the target project.

18. The system of claim 17, the integrated service further comprising instructions which when executed cause the integrated service to:

receive temporary security credentials representing project-specific permissions for the target project granted to the integrated service for the target project; and perform an action on a resource in the provider network using the project-specific permissions for the target project granted to the integrated service for the target project.

19. The system of claim 15, wherein the user designation is one of an owner of the target project, a contributor to the target project, or a viewer of the target project.

20. The system of claim 15, wherein the temporary security credentials for the role comprise an access key, a secret access key, and a session token.

* * * * *